Feb. 23, 1937.  W. G. MYLIUS  2,071,936
WATT-HOUR METER
Filed Oct. 3, 1935  2 Sheets-Sheet 1
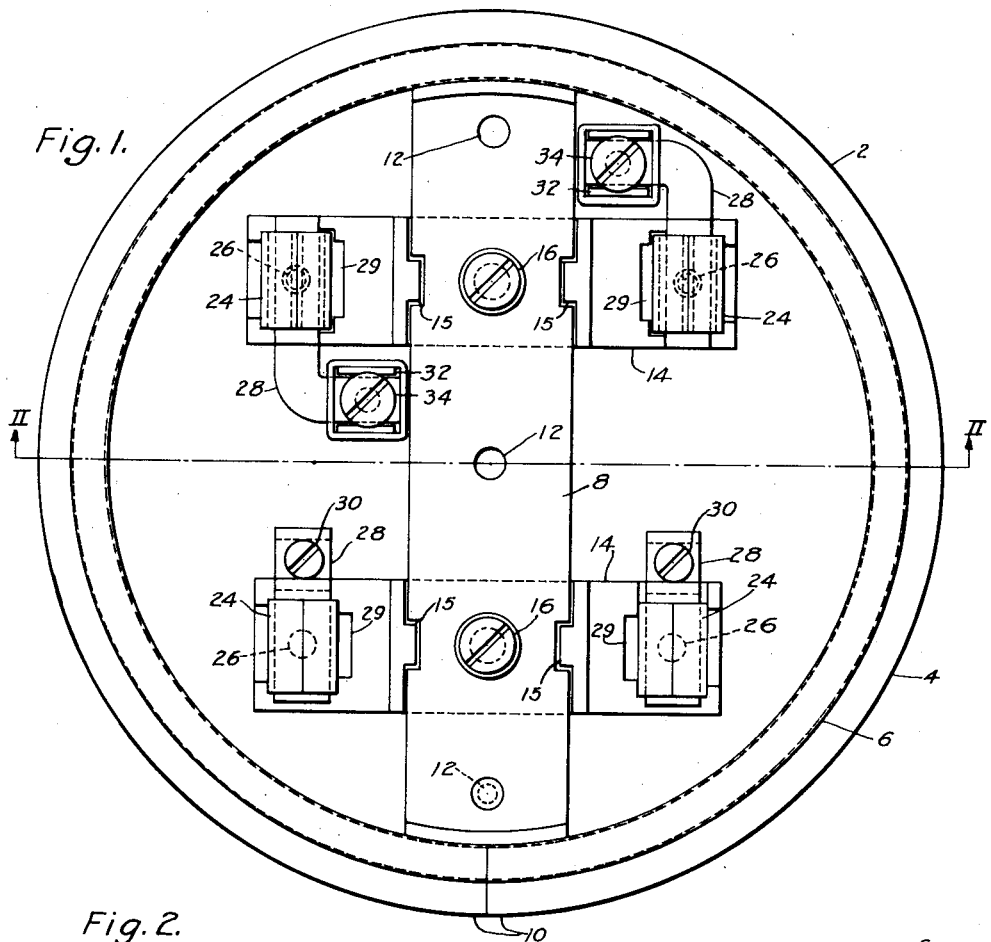
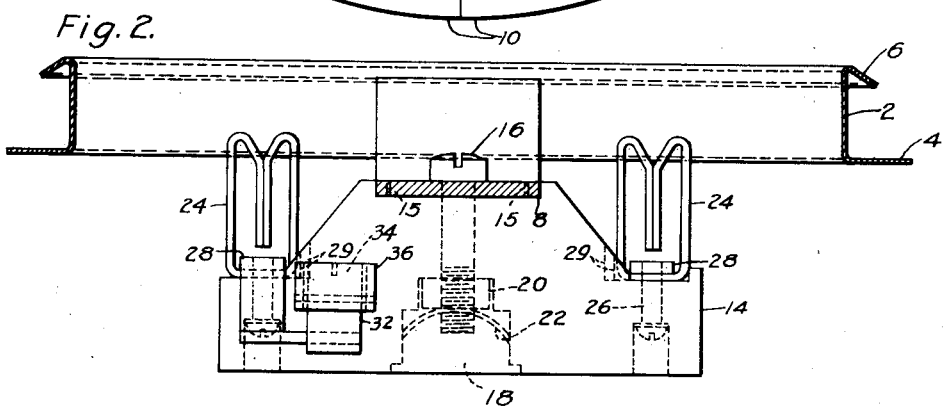
WITNESSES:
INVENTOR
Walter G. Mylius
BY
ATTORNEY

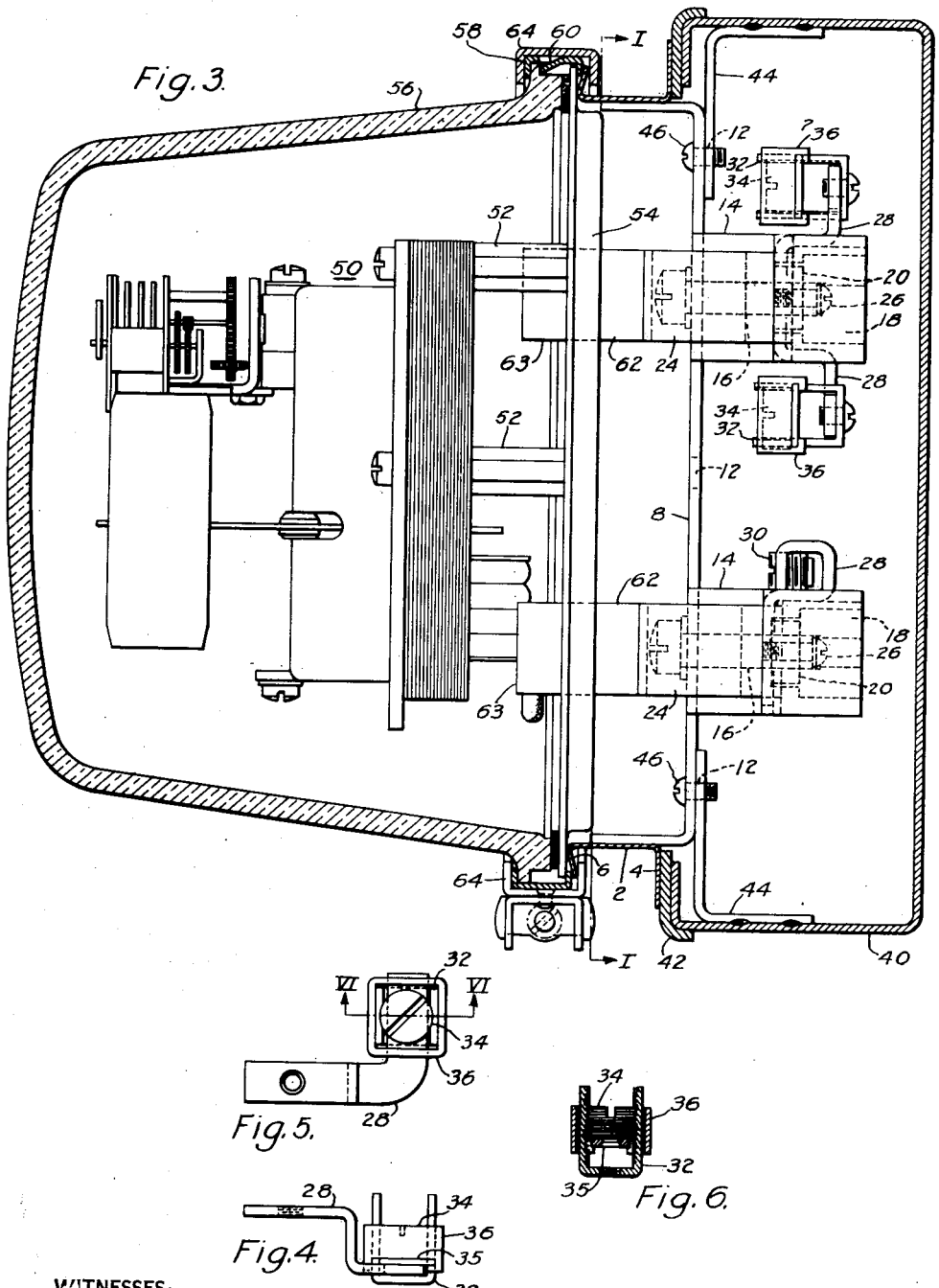

Patented Feb. 23, 1937

2,071,936

UNITED STATES PATENT OFFICE 2,071,936

WATT-HOUR METER

Walter G. Mylius, Summit, N. J., assignor to Westinghouse Electric & Manufacturing Company, East Pittsburgh, Pa., a corporation of Pennsylvania Application October 3, 1935, Serial No. 43,343

4 Claims. (Cl. 247—2)

The present invention relates to watthour meters of the so-called detachable type, as shown, for example, in U. S. Patent No. 1,969,499, issued August 7, 1934, to W. M. Bradshaw, et al., and has particular reference to an improved supporting socket or base for such meter, particularly adapted for mounting meters of this character on switch boxes or on channels which enclose the conductors of a group installation.

It will be appreciated that the meter installation as disclosed in the above-numbered patent is primarily a unit installation and is not peculiarly adapted for mounting in connection with switch and fuse boxes, switchboards or the like. It is an object of the present invention to provide an improved base or socket construction which is relatively inexpensive and which extends the field in which the detachable meter may be used.

In practicing the invention, the supporting base or socket is of skeleton form comprising a ring of sheet material, such as sheet steel, having a bridge extending across it, preferably diametrically, which supports contact socket assemblies which are spaced to receive the contact blades projecting from a detachable meter casing.

Referring to the drawings:

Figure 1 is a plan view of a meter supporting socket constructed in accordance with the present invention, Fig. 2 is a view in section taken on the line II—II of Fig. 1, Fig. 3 is a view in section of the present invention as applied to a meter and a supporting channel or box which encloses the service and supply conductors of a metering installation.

Fig. 4 is a view in side elevation of an improved conductor clamp employed with the present invention, Fig. 5 is a plan view of the clamp shown in Fig. 5, and Fig. 6 is a view in vertical section of the clamp shown in Fig. 5.

Referring more particularly to Figs. 1 and 2, the meter supporting base or socket in accordance with the present invention comprises a substantially cylindrical or ring shaped member 2, which is preferably formed from a strip of sheet material, such as steel or other suitable metal. A radially extending flange 4 is formed from one edge of the member 2 and an outwardly extending flange 6 inclined slightly toward the flange 4 extends from the other edge of the member 2. Both flanges may be formed at the same time by a rolling operation.

The flange 4 is adapted to overlie an opening in a support of any kind, such as the cover of a switch or fuse box, or a rectangular plate which constitutes one section of the closure for a conductor carrying channel, or a switchboard.

The flange 6 is proportioned to confront the base flange of a detachable meter and be clamped thereto by a sealing ring as described more in detail in connection with Fig. 3.

A bridge 8, also of sheet material, extends diametrically across the member 2 and the free ends thereof, which are bent to conform to the inner curvature of the member 2, may be welded to the latter or otherwise suitably secured. In accordance with the present invention, however, it is desired that one end of the bridge 8 overlap the two free abutting ends 10 (Fig. 1) of the member 2 and when welded thereto forms permanent joint effectively closing the small crack between the abutting ends to prevent the insertion of tools or the entrance of foreign matter into the space defined by the member 2.

The bridge 8 is provided with three apertures 12, or as many as desired, for the purpose of securing the assembly to a support, as described in conjunction with Fig. 3.

Two blocks 14 of insulating material such as porcelain are suspended from the bridge 8 by means of bolts 16 which extend through the bridge and a suitable aperture in the porcelain block which terminates in a recess 18. The recess 18 is so formed that it may receive a nut 20 in such manner that the nut cannot turn when the bolt 16 is screwed down, and the nut is held in position by a flexible washer 22, which may be of brass, forced into the opening below the nut. It will be noted that the upper surface of the block 14 is recessed to receive the bridge 8 and projections 15 are provided to register with corresponding notches in the bridge, so that the block 14 is firmly held in its intended position at right angles to the bridge, even though only one bolt 16 is employed.

Each of the insulating blocks is provided with a pair of contact jaws 24 which are maintained in position by machine screws 26 (Fig. 2) extending upwardly through the block 14, through a suitable aperture in the base of the contact jaw, and into threaded engagement with a conducting strap 28. The portion of each block 14 which receives the jaw 24 is recessed, as at 29 so that when the jaw and its conducting strap 28 are rotated 90° the jaw will seat in said recess. When the jaw is in the position shown, or rotated 180° from that position, one side of its base portion bears against a shoulder on the block, as shown.

As a result, when the jaw is in any one of its three possible positions, it is effectively maintained in position by a single securing screw 26.

The two straps 28 in the lower half of Fig. 1 terminate, as shown more clearly in Fig. 3, in a return bent loop for receiving the end of a conductor, the latter being secured therein by means of a set screw 30 for making the service connection to these contact jaws.

The upper conducting straps 28 and the conductor clamp secured thereto are of somewhat different form as shown more clearly in Figs. 4, 5, and 6. The strap 28 is of angular form having the portion which supports the clamp on a lower plane than the portion which extends through the jaw 24. Accordingly, the supply conductors through the upper clamps in the upper half of Fig. 1, will be in a different and lower plane than the service conductors for the purpose of simplifying the wiring of the socket when continuous cables are used.

Each of the upper clamps 28 comprises a member 32 of U-shape having the inner faces of the legs threaded to receive a screw 34. The two legs 32 are surrounded by a substantially rectangular continuous collar 36 to prevent the separation of the legs when the screw 34 is clamped down against a conductor. The screw 34 has a reduced lower portion extending loosely through an aperture in a plate 35 and is deformed to secure it in position so that the plate travels with the screw when the latter is turned. The plate 35 extends beyond the edges of the legs 32 and is interlocked with the collar 36 so that the screw 34, plate 35 and collar 36 move as a unit to clamping position.

As a result, the collar 36 is always in a position to brace the legs 32 at the point of greatest stress tending to spread the legs during the clamping operation. It is contemplated that these terminals, which are larger than those used for the service conductors, will receive the relatively heavier supply conductors in cases where a plurality of the sockets of my invention are mounted on a channel with the supply terminals of all sockets connected in parallel to relatively heavy supply conductors or bus bars.

When the terminal clamps of Figs. 4 through 6 are employed, the wiring of a channel or trough installation is greatly simplified. Conductors for the supply terminals (32 etc.) are extended through the channel before the meter socket is attached thereto. Such conductors may be bare, as a bus bar, or insulated with the insulation removed at spaced points corresponding to the positions of the terminals. After the sockets are secured in position, the portions 34, 35, and 36 of each clamp are removed as a unit. The supply conductor may then be lifted and dropped between the legs 32 of the successive clamps, and when the parts 34, 35, and 36 are replaced and screwed down, the conductor is tightly clamped against the end of conducting strap 28, thereby insuring a good electrical and mechanical connection between the conductor and strap.

Referring more specifically to Fig. 3, the supporting structure in this instance comprises a channel 40 having an open front which is partially closed by a plate 42 suitably secured thereto and having an aperture slightly smaller than the diameter of the flange 4 of the supporting socket 2. The flange 4 may be welded or otherwise suitably secured to the plate 42.

The channel may also be provided with angles 44 secured, as by welding, to the top and bottom walls of the channel and having one leg exposed through the opening defined by the circular aperture in the plate 42 in a position to receive screws 46 threaded through the upper and lower holes 12 of the bridge 8. For a different type of mounting it may be desired to secure the bridge 28 adjacent the center thereof, in which case a screw may be inserted through the central aperture 12 of the bridge.

The meter proper, as in Fig. 3, comprises a measuring mechanism 50 suitably supported as by posts 52 upon a metallic base plate 54. The mechanism may be enclosed by a glass cover 56 which is secured to the base 54 by a permanent clamping ring 58 which embraces the rim on the cover and is provided with portions 60 which snap into recesses in the glass to prevent the removal of the cover from the base without breaking the former. The meter is provided with contact blades 62 which project through the plate 54 and have terminal portions 63 within the cover for connection to the windings thereof.

When the meter is placed in operative position with the contacts 62 inserted in the jaws 24, a sealing ring 64 of the type described in the aforesaid Patent No. 1,969,499 embraces the base flange of the meter and the underedge of the flange 6 on the socket 2. By reason of the inclination of the flange 6, greater structural strength is obtained and another important advantage accrues from its use. In meter mountings the base socket frequently is of cup-shape and of cast material which is relatively thick. The clamping ring 64, therefore, has to be wide enough to receive and accommodate the thick flange on the socket. Inasmuch as this type of meter socket is still widely used and will continue to be manufactured, it is desirable, for purposes of economy, to have the ring 64 standard for all types of installation, and the inclination of the flange 6 is such that a standard type of clamping ring may be used interchangeably on sockets of the cast or sheet metal type.

It should be apparent from the foregoing that an efficient mounting has been devised which is readily adapted to various types of mountings encountered in practice; and is of inexpensive and rugged construction. Quite obviously, many modifications may be made in the exact structure shown, and it is intended that the invention shall only be limited by the scope of the appended claims.

I claim as my invention:

1. A meter supporting socket comprising a strip of sheet material so bent that the free ends thereof are in abutting relation to form a circular member, a bridge extending diametrically across said circular member and secured to the inner periphery thereof with one end overlying said abutting free ends, means for securing the bridge in such position, insulating blocks secured to said bridging member, and spaced pairs of electrical contact devices on each of said blocks including terminals for connection to a circuit.

2. A meter supporting socket comprising a cylindrical member of sheet material, a radially extending flange from one edge of said member for engaging a support, an outwardly extending flange from the other edge of the member inclined toward said first mentioned flange, a bridge of strip material extending across said member with its ends secured thereto, an insulating member for supporting electrical contacts, and means for securing said insulating member to said bridge.

3. A meter supporting socket comprising a cylindrical member of sheet material, a radially extending flange from one edge of said member for engaging a support, an outwardly extending flange from the other edge of the member inclined toward said first mentioned flange, a bridge of strip material extending across said member with its ends secured thereto, an insulating member for supporting electrical contacts, and means for securing said insulating member to said bridge in a plane offset with respect to those defined by the edges of the cylindrical member.

4. A meter supporting socket comprising a cylindrical member of sheet material, a radially extending flange from one edge of said member for engaging a support, an outwardly extending flange from the other edge of the member inclined toward said first mentioned flange, a bridge of strip material extending across said member with its ends secured thereto, an insulating member for supporting electrical contacts, means for securing said insulating member to said bridge in a plane offset with respect to those defined by the edges of the cylindrical member including a bolt extending through said insulating member into a recess in the opposite side thereof for cooperation with a nut, and means for removably retaining said nut in said recess and for preventing turning thereof.

WALTER G. MYLIUS.